US011878262B2

(12) United States Patent
Yun et al.

(10) Patent No.: US 11,878,262 B2
(45) Date of Patent: Jan. 23, 2024

(54) FILTER MODULE

(71) Applicant: SAMSUNG ELECTRONICS CO., LTD., Suwon-si (KR)

(72) Inventors: So-Young Yun, Suwon-si (KR); Jee-Ho Park, Suwon-si (KR); Kwang Seung Lee, Suwon-si (KR); Yasuhiko Kochiyama, Suwon-si (KR); Hyong Soo Noh, Suwon-si (KR); Ki Sup Lee, Suwon-si (KR); Il Yong Cho, Suwon-si (KR); Euy Sung Chu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 899 days.

(21) Appl. No.: 16/770,222

(22) PCT Filed: Dec. 7, 2018

(86) PCT No.: PCT/KR2018/015544
§ 371 (c)(1),
(2) Date: Sep. 11, 2020

(87) PCT Pub. No.: WO2019/112378
PCT Pub. Date: Jun. 13, 2019

(65) Prior Publication Data
US 2023/0201752 A1 Jun. 29, 2023

(30) Foreign Application Priority Data
Dec. 8, 2017 (KR) .................. 10-2017-0168615

(51) Int. Cl.
*B01D 46/00* (2022.01)
*B01D 46/10* (2006.01)
(Continued)

(52) U.S. Cl.
CPC ..... *B01D 46/0032* (2013.01); *B01D 46/0002* (2013.01); *B01D 46/4209* (2013.01); *B01D 46/521* (2013.01)

(58) Field of Classification Search
CPC ............ B01D 46/0002; B01D 46/0032; B01D 46/521; B01D 46/4209
(Continued)

(56) References Cited

U.S. PATENT DOCUMENTS 4,234,324 A * 11/1980 Dodge, Jr. ................ B03C 3/40
96/99
4,772,297 A * 9/1988 Anzai ................... B03C 3/155
96/69
(Continued)

FOREIGN PATENT DOCUMENTS

| CN | 10-2005-0051119 | 6/2005 |
|----|-----------------|--------|
| CN | 10-2011-0088742 | 8/2011 |

(Continued)

OTHER PUBLICATIONS

International Search Report dated Apr. 2, 2019, in corresponding International Patent Application No. PCT/KR2018/015544.
(Continued)

*Primary Examiner* — Minh Chau T Pham
(74) *Attorney, Agent, or Firm* — STAAS & HALSEY LLP (57) ABSTRACT

Provided is a filter module including a filter arranged on a flow path through which air passes, a first electrode arranged to face a first surface of the filter and a second electrode arranged to face a second surface of the filter opposite to the first surface, wherein a space is maintained in at least one of between the first surface and the first electrode or between the second surface and the second electrode through a spacer, so that the first electrode and the second electrode are
(Continued)

prevented from being electrically connected to each other through foreign substances that are collected by the filter at a predetermined amount or more.

14 Claims, 11 Drawing Sheets

(51) Int. Cl.
*B01D 46/42* (2006.01)
*B01D 46/52* (2006.01)

(58) Field of Classification Search
USPC .............. 55/524, 525; 96/66, 69, 99, 108; 422/121, 123, 186.06
See application file for complete search history.

(56) References Cited

U.S. PATENT DOCUMENTS

| | | | |
|---|---|---|---|
| 4,978,372 A | 12/1990 | Pick | |
| 5,904,896 A * | 5/1999 | High | F24F 8/50 422/123 |
| 7,029,520 B2 * | 4/2006 | Park | B01D 46/50 55/525 |
| 7,074,260 B2 * | 7/2006 | Lee | B82Y 30/00 96/108 |
| 7,323,146 B2 * | 1/2008 | Kim | A61L 9/16 422/186.06 |
| 2004/0118093 A1 * | 6/2004 | Chang | B01D 46/0006 55/482 |

FOREIGN PATENT DOCUMENTS

| | | |
|---|---|---|
| JP | 8-266928 | 10/1996 |
| JP | 11-28388 | 2/1999 |
| JP | 2856282 | 2/1999 |
| JP | 2865330 | 3/1999 |
| JP | 11-207207 | 8/1999 |
| KR | 20-1995-0003544 | 5/1995 |
| KR | 10-2006-0053295 | 5/2006 |

OTHER PUBLICATIONS

Office Action dated Sep. 21, 2022, issued in Korean Application No. 10-2017-0168615.
Notice of Allowance dated Nov. 23, 2022, issued in Korean Application No. 10-2017-0168615.
Office Action dated May 24, 2022, in Korean Application No. 10-2017-0168615.
Office Action dated Dec. 26, 2022, in Korean Application No. 10-2022-0155004.

* cited by examiner

FILTER MODULE

CROSS-REFERENCE TO RELATED APPLICATIONS

This application is a U.S. National Stage Application which claims the benefit under 35 U.S.C. § 371 of International Patent Application No. PCT/KR2018/015544 filed on Dec. 7, 2018, which claims foreign priority benefit under 35 U.S.C. § 119 of Korean Patent Application 10-2017-0168615 filed on Dec. 8, 2017, in the Korean Intellectual Property Office, the contents of both of which are incorporated herein by reference

TECHNICAL FIELD

The disclosure relates to a filter module arranged on a flow path through which air passes and collecting foreign substances contained in the air.

BACKGROUND ART

A filter module is a device arranged on a flow path through which air passes and collecting foreign substances contained in the air, and the filter module may be arranged in an air purifier or a duct for use.

Recently, as one of the filter modules, a filter module including a filter through which air passes, a high voltage electrode arranged on a downstream side of an air flow direction of the filter, and a ground electrode arranged on an upstream side of the air flow direction of the filter has been used.

In such a filter module, when power is applied to the high voltage electrode and the ground electrode, an electrostatic force is generated in the filter by a potential difference between the high voltage electrode and the ground electrode.

As foreign substances contained in the air passing through the filter are adsorbed to the filter by the electrostatic force, the filter may more efficiently collect foreign substances, so that the performance of the filter module is improved.

DISCLOSURE

Technical Problem

Therefore, it is an object of the disclosure to provide a filter module capable of preventing a high voltage electrode and a ground electrode from being electrically connected to each other through foreign substances that are collected by a filter at a predetermined amount or more.

Technical Solution

According to an aspect of the disclosure, there is provided a filter module including: a filter arranged on a flow path through which air passes; a first electrode arranged to face a first surface of the filter; a second electrode arranged to face a second surface of the filter opposite to the first surface; and a spacer configured to maintain a space in at least one of between the first surface and the first electrode or between the second surface and the second electrode.

The first electrode and the second electrode may be each formed of a porous electrode including a conductive panel and a plurality of holes formed in the conductive panel.

The filter may have the first surface arranged on a downstream side of a flow direction and the second surface arranged on an upstream side of the flow direction, and the first electrode may form a high voltage electrode to which a high voltage is applied, and the second electrode may form a ground electrode to be grounded.

The spacer may be configured to maintain the space between the first surface and the first electrode.

The spacer may include a first spacer configured to maintain the space between the first surface and the first electrode and a second spacer configured to maintain the space between the second surface and the second electrode.

The spacer may include at least one of a frame portion corresponding to an outer edge of the filter or a spacer portion formed at an inside of the frame portion in a grid shape.

The filter module may further include a housing that forms an external appearance of the filter module and accommodating the filter, the first electrode, and the second electrode therein, wherein the housing may include a first opening at an inside of which the first electrode is arranged and a second opening at an inside of which the second electrode is arranged.

The spacer may protrude from an inner surface of the housing into a space between the first surface of the filter and the first electrode as a unitary body.

The spacer may include a first spacer protruding from an inner surface of the housing into a space between the first surface of the filter and the first electrode as a unitary body and a second spacer protruding from the inner surface of the housing into a space between the second surface of the filter and the second electrode as a unitary body.

The housing may include a first rib portion provided on the first opening and, and the spacer may protrude from an inner surface of the first rib portion toward the filter.

The housing may include a first rib portion provided on the first opening and a second rib portion provided on the second opening, and the spacer may include a first spacer protruding from an inner surface of the first rib portion toward the filter and a second spacer protruding from an inner surface of the second rib portion toward the filter.

According to another aspect of the disclosure, there is provided a filter module including: a housing including a first opening provided on a downstream side of an air flow direction and a second opening provided on an upstream side of the air flow direction; a filter arranged inside the housing; a first electrode formed of a mesh panel, and arranged at an inside of the first opening to face a first surface of the filter; a second electrode formed of a mesh panel, and arranged at an inside of the second opening to face a second surface of the filter; and a spacer configured to maintain a space between the first surface of the filter and the first electrode.

Advantageous Effects

As is apparent from the above, the filter module according to the disclosure includes a spacer that forms a space between electrodes, so that a first electrode corresponding to a high voltage electrode and a second electrode corresponding to a ground electrode can be prevented from being electrically connected to each other even when foreign substances are collected in a filter at a predetermined amount or more.

MODES OF THE DISCLOSURE

The embodiments set forth herein and illustrated in the configuration of the present disclosure are only the most preferred embodiments and are not representative of the full the technical spirit of the present disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section out departing from the teachings of the disclosure. Descriptions shall be understood as to include any and all combinations of one or more of the associated listed items when the items are described by using the conjunctive term "~and/or ~," or the like.

The terms "front", "rear", "upper", "lower", "top", and "bottom" as herein used are defined with respect to the drawings, but the terms may not restrict the shape and position of the respective components.

Hereinafter, a filter module according to embodiments of the disclosure will be described in detail with reference to the accompanying drawings.

Figure 1:
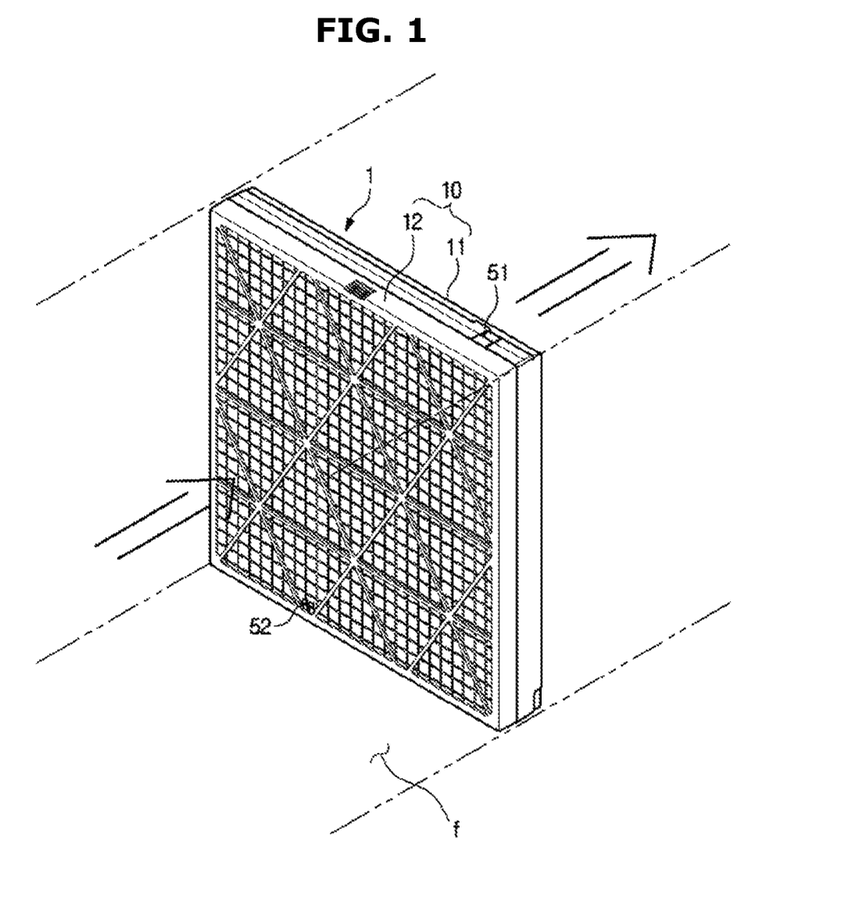
FIG. 1 is a perspective view illustrating a filter module according to the first embodiment of the disclosure.

Referring to FIG. 1, a filter module 1 according to an aspect of the disclosure is arranged on a flow path f through which air passes to collect foreign substances, such as dust, from air passing through the flow path f.

Figure 2:
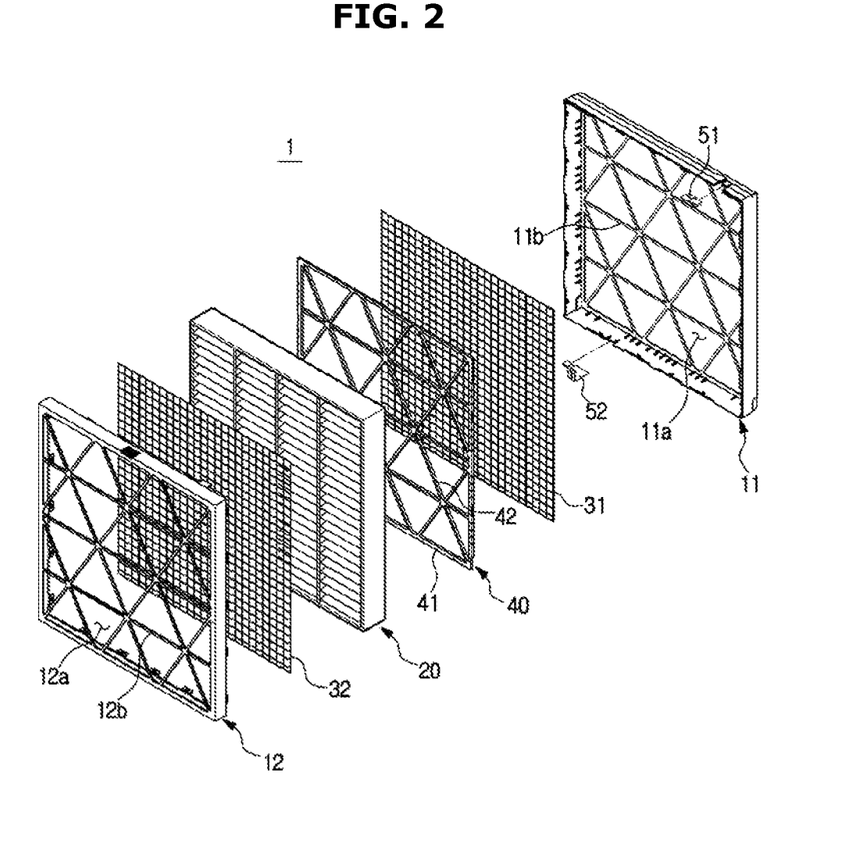
FIG. 2 is an exploded perspective view illustrating the filter module according to the first embodiment of the disclosure.
Figure 3:
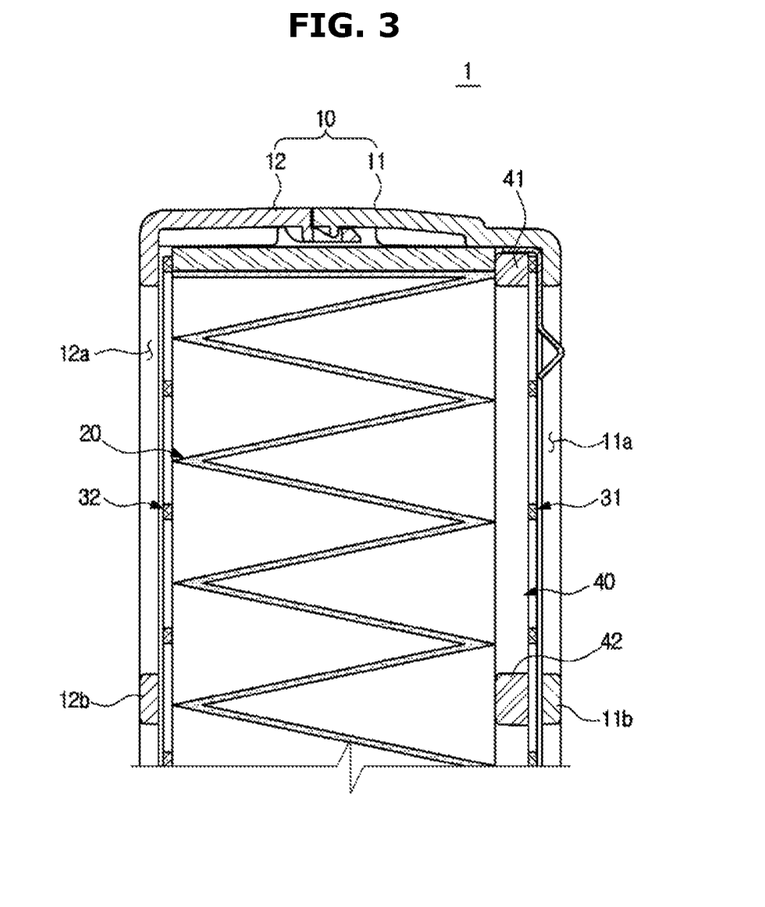
FIG. 3 is a top cross-sectional view illustrating the filter module according to the first embodiment of the disclosure.

Referring to FIGS. 2 and 3, the filter module 1 includes a housing 10 forming the external appearance, a filter 20 arranged inside the housing 10 to collect foreign substances, a first electrode 31 arranged to face a first surface of the filter 20, and a second electrode 32 arranged to face a second surface of the filter 20 opposite to the first surface. On the drawings, the first surface of the filter 20 refers to a rear surface of the filter 20 located on a lower side in an air flow direction, and the second surface of the filter 20 refers to a front surface of the filter 20 located on an upper side in the air flow direction.

The housing 10 includes a first housing 11 and a second housing 12 coupled to each other in the front-rear direction to accommodate the filter 20, the first electrode 31 and the second electrode 32 therein.

The first housing 11 has a first opening 11a that allows air passing through the filter 20 to be discharged to the outside of the housing 10, and a first rib portion 11b formed on the first opening 11a to support one surface of the first electrode 31. The first rib portion 11b is formed in a triangular grid shape to allow air to pass therethrough while supporting the one surface of the first electrode 31.

The second housing 12 includes a second opening 12a that allows air to be sucked into the housing 10 and a second rib portion 12b formed on the second opening 12a to support one surface of the second electrode 32. The second rib portion 12b is formed in a triangular grid shape to allow air to pass therethrough while supporting the one surface of the second electrode 32.

The filter 20 is formed of a hepa filter capable of trapping fine foreign substances, and is formed in a substantially quadrangular block shape.

Each of the first electrode 31 and the second electrode 32 is formed of a metal that is a conductive material, and is formed of a quadrangular plate shaped mesh panel having a mesh.

Although the first electrode 31 and the second electrode 32 are illustrated as being formed of a mesh panel, but the disclosure is not limited thereto. That is, the first electrode 31 and the second electrode 32 may include various types of porous electrodes, for example a conductive plate, such as a metal plate, having a plurality of air transmitting holes.

The first electrode 31 is arranged at an inside of the first opening 11a of the first housing 11, and is supplied with a high voltage to form a high voltage electrode.

The second electrode 32 is arranged at an inside of the second opening 12a of the second housing 12, and is grounded to form a ground electrode.

In addition, the filter module 1 includes a spacer 40 arranged between the first surface of the filter 20 and the first electrode 31.

The spacer 40 is formed of an electrically insulating material that does not conduct electricity, and serves to electrically isolate the filter 20 from the first electrode 31. The spacer 40 includes a frame portion 41 corresponding to an outer edge of the filter 20 and a spacer portion 42 provided at an inside of the frame portion 41 in a grid shape and interposed between and supporting against the first surface of the filter 20 and the first electrode 31.

The frame portion 41 is formed in a quadrangular ring shape to correspond to the outer edge of the filter 20 formed in a quadrangular block shape, and the spacer portion 42 is formed in a triangular grid shape to correspond to the first rib portion 11b and the second rib portion 12b.

Accordingly, the spacer 40 allows a space between the first surface of the filter 20 and the first electrode 31 to be maintained at a predetermined distance or more, and even when foreign substances collected in the filter 20 increase to a predetermined amount or more, the first electrode 31 and the second electrode 32 are prevented from being electrically conducted through the foreign substances collected in the filter 20.

As described above, the spacer 40 is arranged between the first surface of the filter 20 located on the downstream side of the air flow direction and the first electrode 31. This is because the foreign substances collected by the filter 20 are mainly accumulated on the upstream side of the air flow direction of the filter 20, rather than an area between the first surface of the filter 20 located on the downstream side of the air flow direction and the first electrode 31. Accordingly, when the first surface of the filter 20 and the first electrode 31 are kept spaced apart from each other through the spacer 40, even a large amount of foreign substances collected on the upstream side of the flow direction of the filter 20 does not cause the first electrode 31 and the second electrode 32 to be electrically conducted.

Although the spacer 40 is illustrated as including the frame portion 41 and the spacer portion 42, the disclosure is not limited thereto. That is, the spacer may include only a spacer portion without a structure corresponding to a frame portion. In addition, when the first electrode 31 has a sufficiently great stiffness, the spacer may include only a frame portion without a structure corresponding to a spacer portion.

Although the first rib portion 11b, the second rib portion 12b, and the spacer portion 42 are illustrated as being all formed in a triangular grid shape, the disclosure is merely an example. That is, the first rib portion, the second rib portion, and the spacer portion may be formed in various shapes according to design, such as a quadrangular grid shape or a hexagonal grid shape. Further, the first rib portion, the second rib portion, and the spacer portion may be formed in different grid shapes.

Figure 4:
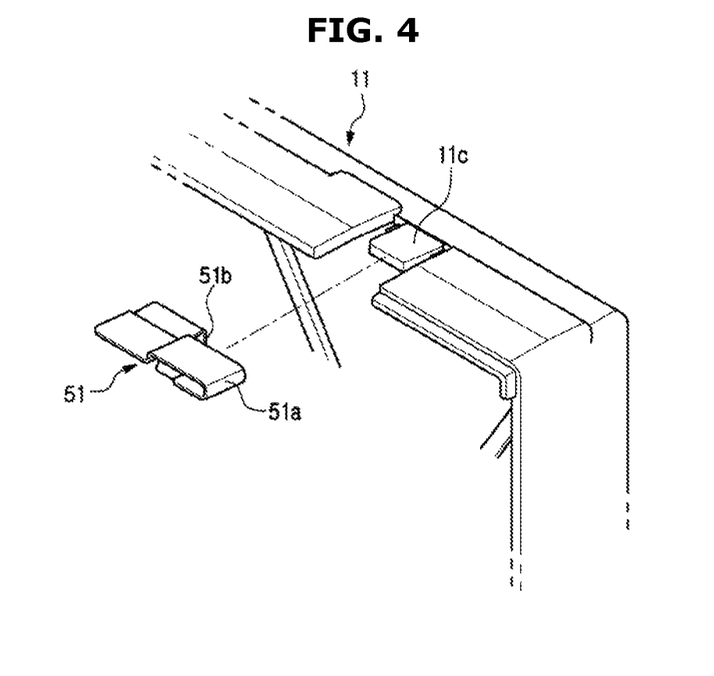
FIG. 4 is an exploded perspective view illustrating a first terminal used for the filter module according to the first embodiment of the disclosure.
Figure 5:
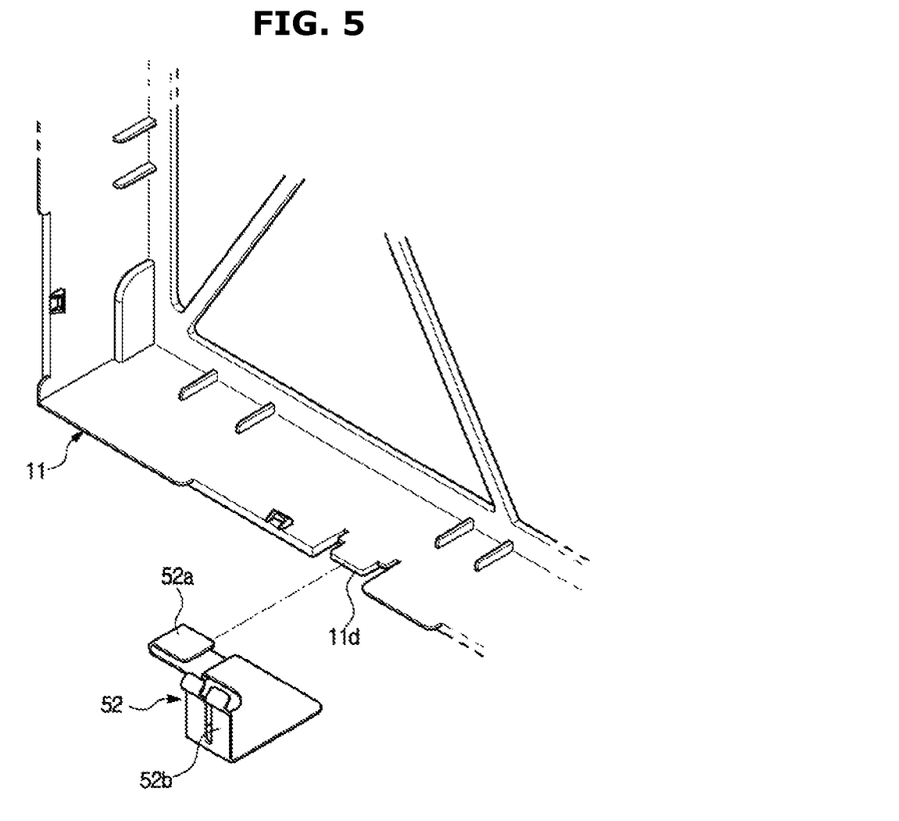
FIG. 5 is an exploded perspective view illustrating a second terminal used for the filter module according to the first embodiment of the disclosure.

Referring to FIGS. 4 and 5, the filter module 1 includes a first terminal 51 and a second terminal that allow the first electrode 31 and the second electrode 32 to be connected to a power source outside the housing 10, respectively.

The housing 10 includes a first terminal installation portion 11c provided on the upper portion of the first housing 11 and on which the first terminal 51 is installed, and a second terminal installation portion 11d provided on the lower portion of the first housing 11 and on which the second terminal 52 is installed. In the embodiment, the first terminal installation portion 11c and the second terminal installation portion 11d are formed in a protruding manner by cutting a portion of the outer surface of the first housing 11.

The first terminal 51 includes a first terminal portion 51a installed on the first terminal installation portion 11c and exposed to the outside and a first connection portion 51b extending to the inside of the housing 10 and connected to the first electrode 31.

The second terminal 52 includes a second terminal portion 52a installed on the second terminal installation portion 11d and exposed to the outside and a second connection portion 52b extending to the inside of the housing 10 and connected to the second electrode 32.

Although the spacer 40 is illustrated as being arranged between the first surface of the filter 20 and the first electrode 31, the disclosure is not limited thereto.

Figure 6:
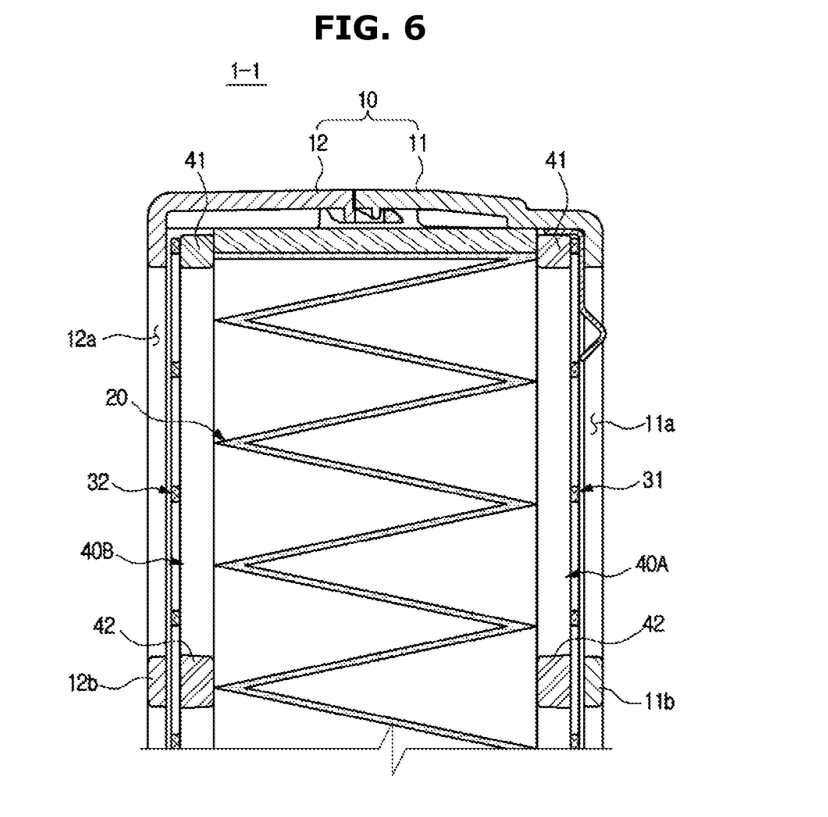
FIG. 6 is a top cross-sectional view illustrating a filter module according to the second embodiment of the disclosure.

That is, referring to FIG. 6 illustrating the second embodiment of the disclosure, the filter module 1 may include a first spacer 40A arranged between the first surface of the filter 20 and the first electrode 31 and a second spacer 40B arranged between the second surface of the filter 20 and the second electrode.

When the filter module 1 includes the first spacer 40A and the second spacer 40B, the filter module 1 forms a structure in which both sides are symmetrical with respect to the filter 20. Therefore, the filter module 1 may be installed without considering the direction of the filter module 1, which enables installation convenience.

Although the spacers 40A and 40B are manufactured separately from the housing 10 and then are arranged between the first surface of the filter 20 and the first electrode 31, the disclosure is not limited thereto.

Figure 7:
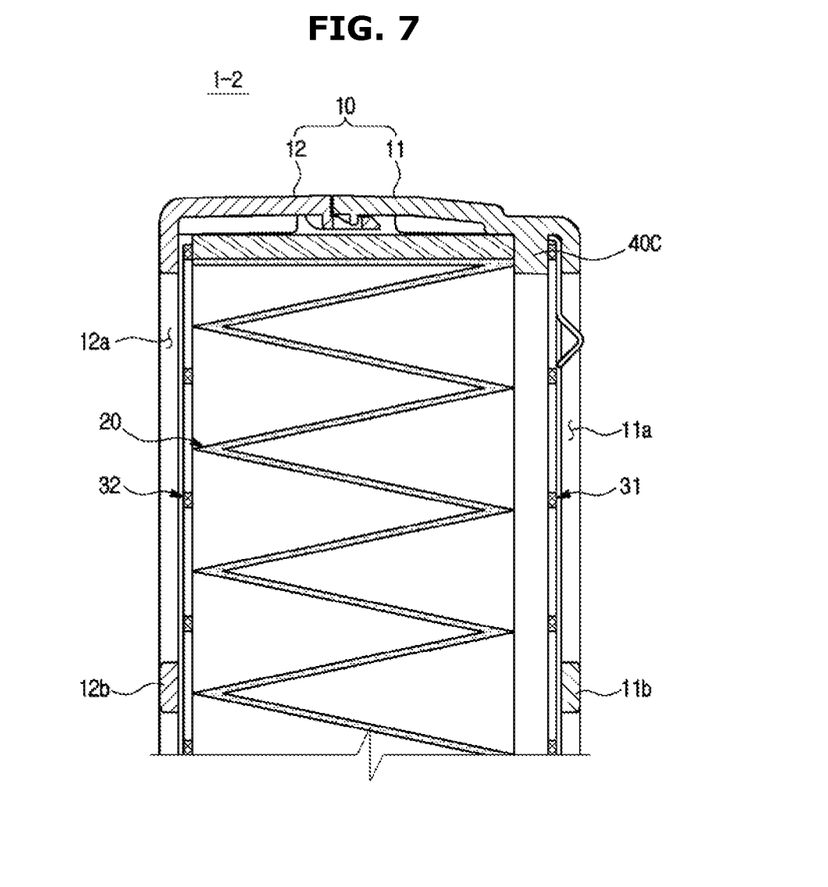
FIG. 7 is a top cross-sectional view illustrating a filter module according to the third embodiment of the disclosure.

That is, referring to FIG. 7 illustrating the third embodiment of the disclosure, a spacer 40C may protrude from an inner surface of the first housing 11 into the space between the first surface of the filter 20 and the first electrode 31. That is, the spacer 40C may be integrally formed with the first housing 11.

In this case, the spacer 40C protrudes in a bar shape from an inner upper surface and an inner lower surface of the first housing 11, so as to support upper and lower portions of the first surface of the filter 20 and upper and lower portions of the first electrode 31.

Figure 8:
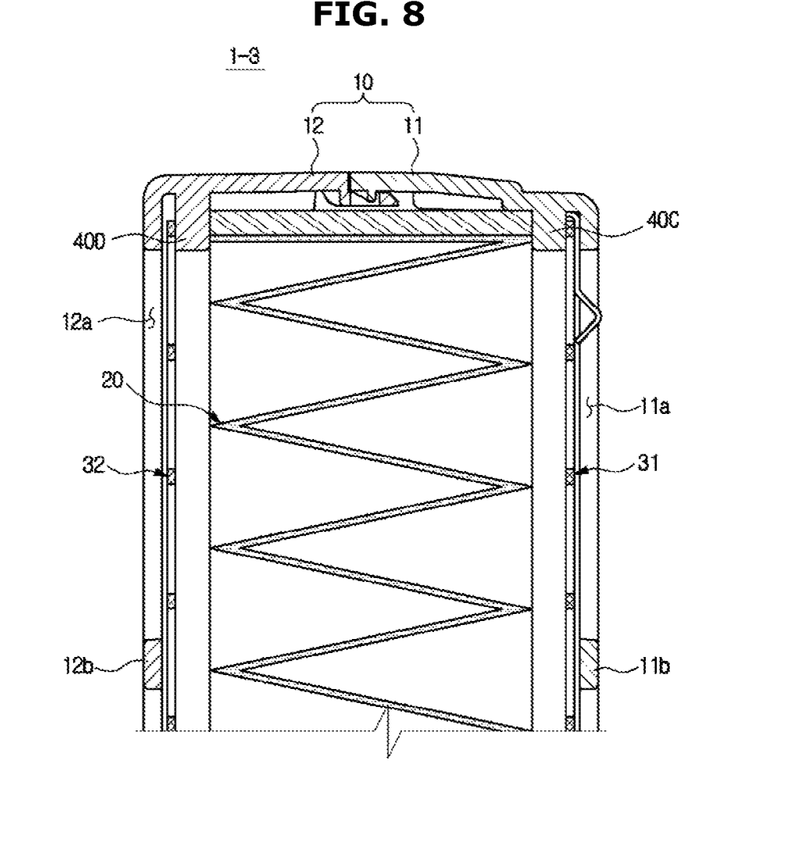
FIG. 8 is a top cross-sectional view illustrating a filter module according to the fourth embodiment of the disclosure.

In addition, referring to FIG. 8 illustrating the fourth embodiment of the disclosure, the spacer 40 may include a first spacer 40C protruding from the inner surface of the first housing 11 into the space between the first surface of the filter 20 and the first electrode 31 as a unitary body and a second spacer 40D protruding from the inner surface of the second housing 12 into the space between the second surface of the filter 20 and the second electrode 32 as a unitary body.

Figure 9:
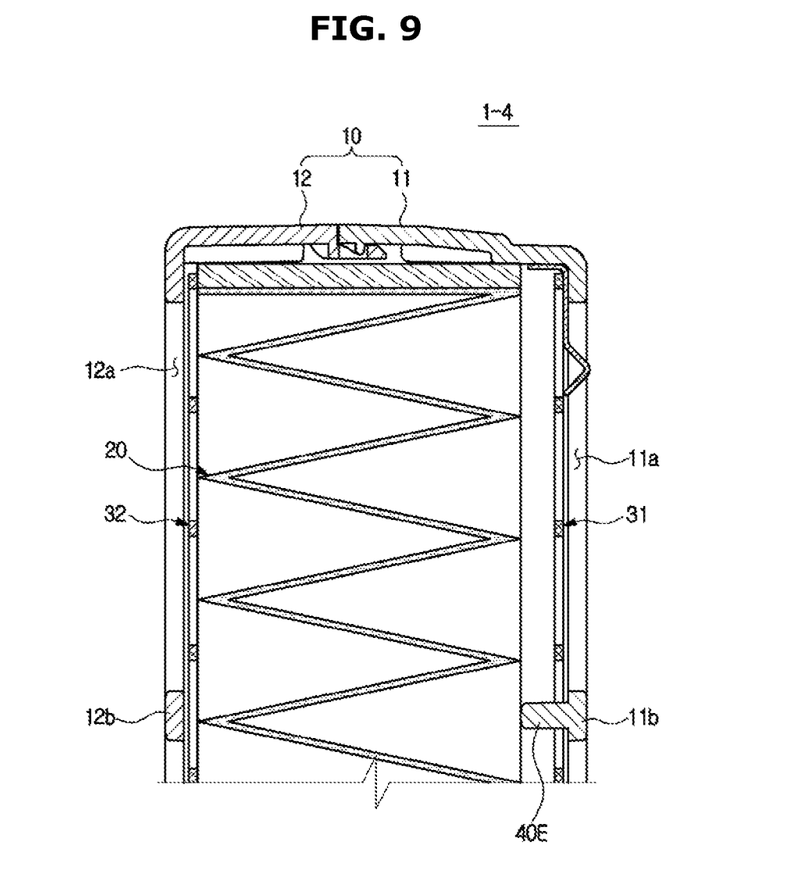
FIG. 9 is a top cross-sectional view illustrating a filter module according to the fifth embodiment of the disclosure.
Figure 10:
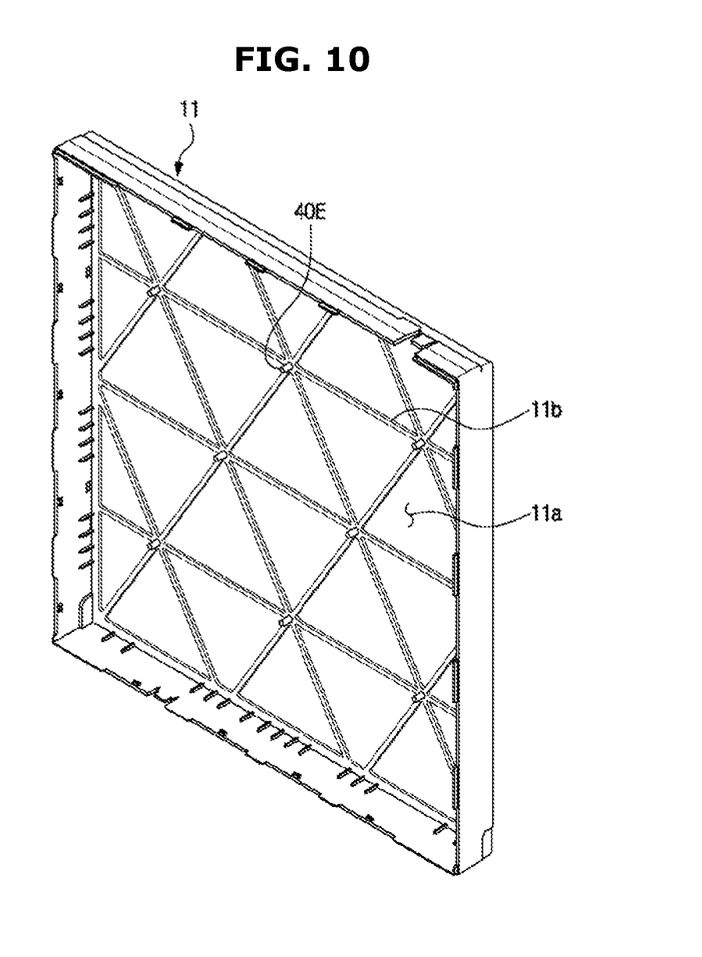
FIG. 10 is a perspective view illustrating a first housing used for the filter module according to the fifth embodiment of the disclosure.

In addition, referring to FIGS. 9 and 10 illustrating the fifth embodiment of the disclosure, a spacer 40E may protrude from an inner surface of the first rib portion 11b toward the filter 20 as a unitary body.

In this case, the spacer 40E passes through a hole of the first electrode 31 so that a front end portion of the spacer 40E is supported on the first surface of the filter 20.

Accordingly, the first surface of the filter 20 is maintained at a predetermined distance from the first electrode 31 through the spacer 40E.

Figure 11:
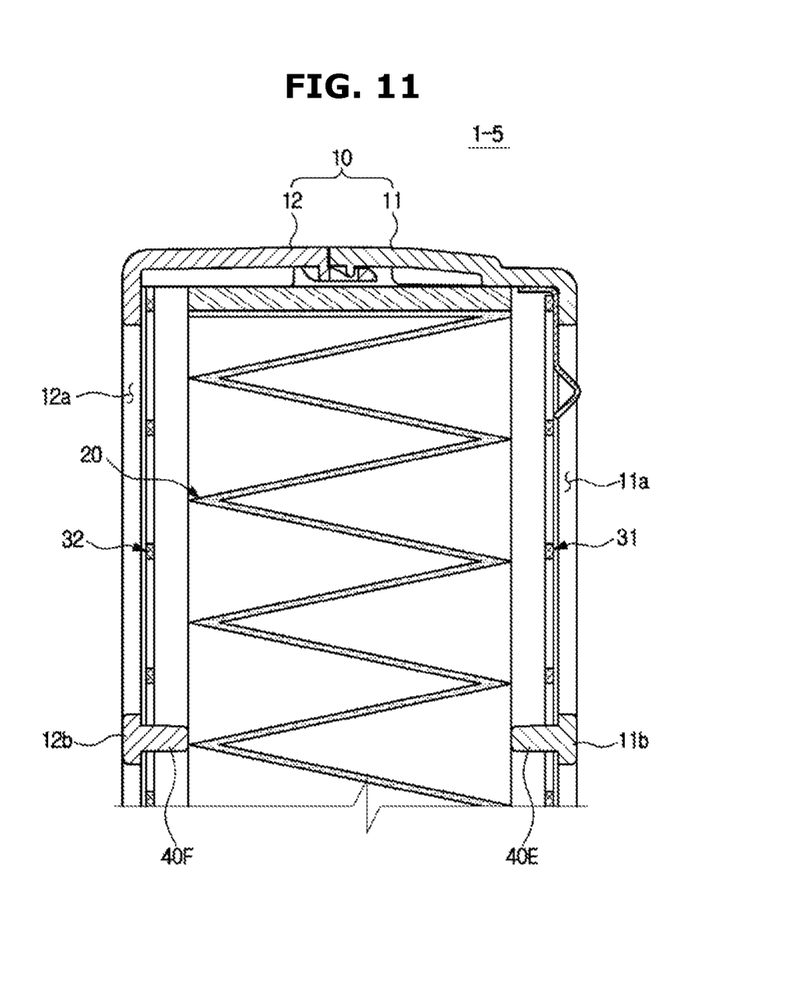
FIG. 11 is a top cross-sectional view illustrating a filter module according to the sixth embodiment of the disclosure.

In addition, referring to FIG. 11 illustrating the sixth embodiment of the disclosure, first spacers 40E and 40F may include a first spacer 40E protruding from an inner surface of the first rib portion 11b toward the filter 20 as a unitary body and a second spacer 40F protruding from an inner surface of the second rib portion 12b toward the filter 20 as a unitary body.

In this case, the first spacer 40E passes through a hole of the first electrode 31 so that a front end portion of the first spacer 40E is supported on the first surface of the filter 20, and the second spacer 40F passes through a hole of the second electrode 32 so that a front end portion of the second spacer 40F is supported on the second surface of the filter 20.

Therefore, the first surface of the filter 20 is maintained at a predetermined distance from the first electrode 31 by the first spacer 40E, and the second surface of the filter 20 is maintained at a predetermined distance from the second electrode 32 by the second spacer 40F.

The scope of the disclosure is not limited to the aforementioned embodiments. It will be understood by those skilled in the art that various changes in form and details may be made therein without departing from the spirit and scope of the disclosure as defined by the appended claims and their equivalents.

The invention claimed is:

1. A filter module comprising:
   a filter;
   a first electrode facing a first surface of the filter;
   a second electrode facing a second surface, opposite to the first surface, of the filter; and
   a first spacer configured to maintain a space between the first surface and the first electrode,
   wherein the filter module is configured to be arranged in a flow path of air so that the air flows through the filter from the second surface to the first surface with the second electrode at an upstream side of the filter along the flow path and the first electrode at a downstream side of the filter along the flow path, and so that the space maintained by the first spacer prevents electrical conduction between the first electrode and the second electrode due to foreign substances collected in the filter upstream of the first surface.

2. The filter module of claim 1, wherein the first electrode and the second electrode are each formed of a porous electrode including a conductive panel and a plurality of holes formed in the conductive panel.

3. The filter module of claim 1, wherein
   the first electrode forms a high voltage electrode, and the second electrode forms a ground electrode.

4. The filter module of claim 1, further comprising:
   a second spacer configured to maintain a space between the second surface and the second electrode.

5. The filter module of claim 1, wherein the first spacer includes at least one of a frame portion corresponding to an outer edge of the filter or a spacer portion formed at an inside of the frame portion in a grid shape.

6. The filter module of claim 1, further comprising:
   a housing that forms an external appearance of the filter module and houses the filter, the first electrode, and the second electrode,
   wherein the housing includes a first opening at an inside of which the first electrode is arranged and a second opening at an inside of which the second electrode is arranged.

7. The filter module of claim 6, wherein the first spacer protrudes from an inner surface of the housing into a space between the first surface of the filter and the first electrode as a unitary body.

8. The filter module of claim 6, wherein
   the first spacer protrudes from an inner surface of the housing into a space between the first surface of the filter and the first electrode as a unitary body, and
   the filter module includes a second spacer protruding from the inner surface of the housing into a space between the second surface of the filter and the second electrode as a unitary body.

9. The filter module of claim 6, wherein the housing includes a first rib portion provided on the first opening and, and the first spacer protrudes from an inner surface of the first rib portion toward the filter.

10. The filter module of claim 6, wherein
    the housing includes a first rib portion provided on the first opening and a second rib portion provided on the second opening,
    a first spacer protrudes from an inner surface of the first rib portion toward the filter, and
    the filter module includes a second spacer protruding from an inner surface of the second rib portion toward the filter.

11. A filter module comprising:
    a housing including a first opening and a second opening;
    a filter inside the housing;
    a first electrode, which is a mesh panel, at an inside of the first opening and facing a first surface of the filter;
    a second electrode, which is a mesh panel, at an inside of the second opening and facing a second surface, opposite to the first surface, of the filter; and
    a spacer configured to maintain a space between the first surface and the first electrode,
    wherein the filter module is configured to be arranged in a flow path of air so that the air flows through the filter from the second surface to the first surface with the second opening and the second electrode at an upstream side of the filter along the flow path, the first opening and the first electrode at a downstream side of the filter along the flow path, the second electrode forming a ground electrode, and the first electrode forming a high voltage electrode, and so that the space maintained by the spacer prevents electrical conduction between the first electrode and the second electrode due to foreign substances collected in the filter upstream of the first surface.

12. The filter module of claim 11, wherein the spacer includes at least one of a frame portion corresponding to an outer edge of the filter and a spacer portion formed at an inside of the frame portion in a grid shape.

13. The filter module of claim 11, wherein the spacer protrudes from an inner surface of the housing into a space between the first surface of the filter and the first electrode.

14. The filter module of claim 11, wherein
    the housing includes a rib portion on the first opening in a grid shape, and
    the spacer protrudes from the rib portion as a unitary body and passes through the first electrode so as to be supported on the first surface.

* * * * *